Patented Mar. 2, 1954

2,671,032

UNITED STATES PATENT OFFICE 2,671,032

METHOD OF DISPERSING SATIN WHITE

Ralph N. Thompson, Mount Lebanon, Pa., assignor to Calgon, Incorporated, a corporation of Pennsylvania No Drawing. Application March 4, 1950,
Serial No. 147,773

4 Claims. (Cl. 106—306)

This invention relates to a method of treating satin white whereby it can be more readily handled and used on a more economical basis in the coating of various substances, principally paper.

Satin white is currently believed to be calcium sulfoaluminate. The exact composition of satin white has been debated for many years by those skilled in the art. It is a white pigment used rather extensively in the paper industry to produce coated papers having a high degree of whiteness, high gloss, good water resistance, and good printing qualities. Due to the rather substantial difficulty which has been experienced in using it for paper coating work, many substitutes have been tried but none is completely equal to it.

Satin white is made by interacting alum with slaked lime. Two general methods of preparation are employed, one being the addition of a concentrated alum solution to a lime paste followed by mixing in a high density mixer. The amount of water used is such that the finished paste will contain about 31% solids. The second method in general use involves spraying a solution containing 10% alum by weight into a slurry containing about 5% calcium oxide by weight until such a time as the reaction is completed. This is followed by filter pressing the resulting slurry to a paste which ultimately contains from 20 to 25% solids. Either method will generally produce a satisfactory satin white.

Various formulae have been assigned to the pigment. Originally it was believed to be a mixture of calcium sulfate and aluminum hydrate. Later various researchers concluded that it was calcium sulfate and calcium aluminate but according to the present theory, it is calcium sulfoaluminate formed according to the reaction:

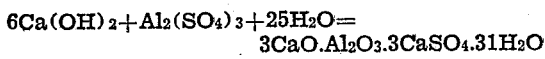

I have conducted work which sheds some light on the composition. If a lime slurry of known strength is very carefully titrated with an alum solution and the molal ratio of alum to lime is plotted against pH, the resultant titration curve would indicate that there is a series of calcium sulfoaluminates corresponding to molal ratio of 0.142, 0.166, and 0.333. Their formulae may be written as $4CaO.Al_2O_3.3CaSO_4$,

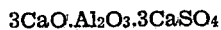

and $Al_2O_3.3CaSO_4$. Since satin whites used in the paper industry generally have pH values ranging between 10 and 12, they are very probably mixtures of the first two compounds together with impurities such as calcium carbonate and possibly certain magnesium compounds. The impurities are largely dependent upon the grade of lime employed in the manufacture.

Satin white is usually sold as a paste containing about 30% by weight of dry matter. This statement is somewhat indefinite since the loss of moisture from satin white depends on the temperature at which it is dried. When exposed to indoor atmospheric conditions, satin white which has been dried at 75° C. slowly regains part of the weight lost. The rate of moisture lost at 75° C. is also very slow, and as much as a week may be needed to reach constant weight.

In paper coating, satin white is used with clay in amounts usually varying from about 5% to about 35% of the total weight of the pigment. In comparison with the clays commonly employed, its adhesive demand is extremely high. A high finish coating clay usually requires about a 15% adhesive pigment ratio (the ratio of dry adhesive to dry pigment expressed as a percentage of the dry pigment) to make a coating which will not pick when printed by the letter press method. Satin whites on the contrary, for a comparable strength coating require anywhere from about 50% to 70% adhesive pigment ratio. This high adhesive demand undoubtedly accounts for some of the difficulty in using satin white in paper coating processes.

Since satin white is commercially available in paste form, various methods of dispersing the pigment have been devised. U. S. Patent 1,261,135 discloses the addition of small amounts of dry, finely powdered gum arabic to the paste to render it fluid. Other materials such as some of the sodium salts of sulfonic acids of dinaphthylmethane are reported to have this same effect on some satin whites but not on all of them. Supposing that other known dispersing agents would react in a similar fashion, I added various molecularly dehydrated phosphates to satin white but without success. These phosphates have been used for many years in the dispersing of clay, and more recently in aqueous drilling fluids for oil well drilling operations. When phosphates are added to clays and drilling fluids for dispersion, very small quantities of phosphate cause drastic viscosity reductions due to effective dispersion of the solid particles. In the preparation of drilling fluids, this is highly desirable. In that operation, if the fluid becomes too viscous considerable difficulty is encountered in circulating it throughout the pumping and transporting equipment as well as in the well itself. Likewise, in clay dispersion for ceramic manufacture and related operations, minimum amounts of water are required when an effective dispersant is used.

I have made the surprising discovery that satin white does not react in the same manner with the molecularly dehydrated phosphates as do the clays and other materials which are used in paper coating processes, unless I pre-treat the satin white according to procedures which I have developed.

In my investigation of the dispersion of satin white, I conducted an initial series of experiments wherein satin white paste was dispersed with varying amounts of a commercial sodium metaphosphate glass sold as "Calgon" having a ratio of $Na_2O:P_2O_5$ of about 1.1:1. I also conducted experiments using a potassium metaphosphate having a ratio of $K_2O:P_2O_5$ of about 1:1 and I made mixtures of these two phosphates for dispersion of satin white. I found in all cases that the dispersing action was quite transitory and that the slips of satin white gelled within a very few hours. I found that all of the colors containing satin white dispersed with Calgon, potassium metaphosphate, or mixtures of the two phosphates were actually more viscous than a color made without the phosphates. This was of course entirely unexpected inasmuch as these particular phosphates and mixtures of the sodium and potassium phosphates which I used have been widely employed for dispersion of pigments, clays, and other finely divided materials.

In an attempt to overcome this undesirable result, I conducted a series of experiments wherein I added increasingly large increments of a casein glue to satin white paste and to a satin white paste dispersed with a mixture of 1.5% by weight of Calgon brand sodium phosphate glass, based on the weight of dry satin white. I also made additions of casein glue to a satin white paste dispersed with 1.5% by weight of potassium metaphosphate. These I compared with an untreated satin white dispersed with a solution of 3.0% by weight of Calgon brand sodium phosphate glass. I measured the viscosity at various adhesive pigment ratios and discovered that at the ratios encountered in plant practice, the three phosphate-dispersed satin whites gelled to a greater extent than the satin white which was mixed with casein glue alone.

Following the teachings of the prior art as set forth in U. S. Patent 1,261,135, in which gum arabic is disclosed for rendering satin white more fluid, I employed several vegetable gums for the purpose of protecting the satin white by a colloid before its dispersion with phosphate. Additions of various starches and converted starch products such as dextrines were made without any noticeable success.

However, upon using a synthetic gum known as Amberlite W-1 resin, made by the Resinous Products Division of Rohm and Haas Company of Philadelphia, I discovered that the satin white could be protected sufficiently so that dispersion with the sodium phosphate glass was quite satisfactory. I prepared a dispersion which was exceptionally stable for over a week by employing 0.75% by weight of Amberlite W-1 resin followed by an addition of 0.50% Calgon brand sodium metaphosphate glass. Concentrations of the gum and the phosphate were both based on the weight of the dry satin white. In addition to providing excellent dispersions of satin white and coating colors of good fluidity, this treatment with the resin followed by dispersion with the phosphate decreased the adhesive demand of the satin white by approximately 18%.

I then made the surprising discovery that by pretreating with casein prior to the phosphate addition, I obtained results which were entirely different than those obtained when I used casein after the phosphate addition. I mixed a satin white paste with sufficient casein glue to give a ratio of 11% and at the end of one hour of mixing, I added 0.5% phosphate by weight based on the dry weight of the satin white and mixed thoroughly. The stability of this dispersion was equal to that obtained by Amberlite W-1 resin and the coating color made from it was more fluid than a control prepared according to procedure using no phosphate. The adhesive demand of the satin white prepared by this casein pre-treatment appeared to be reduced to an even greater extent than when using Amberlite W-1 resin.

The following formula is typical of satin white coatings used in the paper industry at the present time:

| | Parts |
|---|---|
| Stellar Coating Clay (produced by Edgar Brothers Co.) | 50 |
| Satin White (31% solids paste) (produced by Hercules Powder Co.) | 50 |
| Water (used with clay) | 70 |
| Adhesive (dry basis) | 17 |

The adhesive was prepared in solution with alkali and the solution contained 16.6% adhesive solids. The adhesive demand of the clay was determined to be about 15% and by difference, the adhesive demand of the satin white was calculated to be about 65.5% based on the dry weight of satin white.

To obtain results for comparison with those secured by using the above formula, I made up a control batch. The clay and water were pugged to a smooth paste and the satin white was then added and the whole mixed until homogeneous. Following this, the casein glue was added and mixed until the color was smooth and free from lumps. The casein was cut with 7% borax by weight and 7% by weight of 26° Bé ammonia.

To prepare the dispersed satin white, I mixed satin white paste and casein glue in amounts such that the ratio of dry casein glue to dry satin white was about 11%. I have found that very small amounts of the protective colloid exert a beneficial effect, even when in the neighborhood of only 1% to 2%. The ratio can, of course, exceed 10%–12% but it is not economically feasible at higher levels. The mixing times varied from ½ hour to 2 hours. Following this, varying amounts of Calgon brand sodium phosphate glass were added for dispersion of the satin white. Percentages by weight of phosphate used varied from about 0.3% by weight to about 1.0% by weight based on the dry weight of satin white, although even smaller amounts of phosphate ranging to as low as 0.1% by weight are effective, as are amounts in excess of 3.0%. The optimum concentration of phosphate is in the vicinity of 1.0% by weight, however.

Using optimum conditions of 1 hour mixing time as applied to the casein glue and satin white, coupled with the 1% by weight of phosphate glass for treating the satin white, a series of batches was prepared holding the total solids content constant, but varying the adhesive pigment ratio. With respect to pick test, an adhesive pigment ratio of 24% for the color containing the treated satin white was as effective as an adhesive pigment ratio dry weight basis of about 27.5% for the color containing the untreated satin white. In addition to this, I found the viscosities of the color containing the treated satin white were much lower.

Using the lower adhesive pigment ratio established for the treated satin white, I made up a series of colors at different solids content. By reversing the order of addition of clay and casein, that is to say by adding the clay slip to the casein glue and the adding the dispersed satin white, still lower viscosities at higher solids content can be obtained.

Although I am unable to explain the reason for gel formation in the three-component system of satin white, phosphate, and casein when the phosphate was added to the satin white before the casein was added, I have definitely found that the satin white must first be treated with a suitable protective colloid before dispersion with phosphate is attempted if desirable results are to be secured. Mixing time and mixing conditions will vary depending upon raw materials and other factors. I have found in the laboratory that good results were obtained by mixing the satin white with casein glue in an ordinary breaker with a paddle-type agitator, for about one hour. Maximum results were obtained under these conditions. However, in actual mill practice where the efficiency of mixing might be less, the time required would be correspondingly greater.

Since it has been shown that satin whites may vary in composition depending upon the source of manufacture, the optimum amounts of casein and phosphate required to effect maximum results would naturally vary. Each paper mill using satin white for coating purposes would of necessity be required to determine the optimum conditions for its satin white as prepared in its own mixing equipment.

One of the greatest benefits obtained by following my process is the saving of adhesives due to the reduction of adhesive demand of the satin white. Based on the formula which I used in my study, the lowering of adhesive demand of the finished color from 27.5% to 24% dry weight basis represents a 21% reduction in the adhesive demand of the satin white itself. No reduction in adhesive demand of the clay was noticed. The overall savings of adhesive amounts in this case to about 12.5% of the original amount of adhesive called for in the basic formula. Referring again to the basic formula, the net savings per 100 gallons of color would amount to about $1.74 assuming the price of the particular phosphate employed to be 16 cents per pound and the casein 30 cents per pound. In other words, the expenditure of one cent for the phosphate results in a corresponding saving of about $0.075 on casein. Further, the increase in solids of the color from 27% to 33% represents about 5 gallons of water less per 100 gallons of color. Since the water must be removed from the coating during drying, reduction of the total water content results in a corresponding reduction in heating costs required for drying the finished coated paper.

While I have emphasized the use of either Amberlite W-1 resin or casein glue as the protective colloid pre-treating agent, it is understood that other materials may be employed with equally satisfactory results. For example, I may use other protein type adhesives, whether of animal or vegetable origin, such as animal glues, purified soya bean protein, and related materials. Although the vegetable gums which I have used do not protect the satin white to the degree which casein and some of the other materials do, the pre-treatment effect is present to a limited extent.

Similarly, although I prefer to employ a sodium phosphate glass having a ratio of $Na_2O$ to $P_2O_5$ of 1.1:1, my choice is necessarily due to the fact that this particular glass is commercially available and is widely used in the paper industry. It is within the scope of my invention to employ any water-soluble molecularly dehydrated phosphate, glassy or crystalline, of the alkali metals or the molecularly dehydrated ammonium phosphates, or mixtures thereof. Particularly efficacious are the glassy phosphates having a ratio of $M_2O$ to $P_2O_5$ where M is an alkali metal or the ammonium radical of from about 0.5:1 to about 2.0:1. Mixtures, either physical or chemical, of any of these materials will be suitable in providing a suitable degree of dispersion. In other words, any of the phosphates which are employed for securing dispersion of pigments may be employed in the coating process, wherein satin white is a component part of the coating, so long as the satin white is pre-treated with an effective protective colloid material in the manner I have indicated. I may also use normally water-insoluble crystalline phosphates which can be solubilized by methods which are known in the art, as for example as set forth in U. S. Patent 2,405,276.

Having thus described my invention, what I claim as novel and desire to secure by Letters Patent is as follows:

1. A method of treating satin white whereby it is rendered more readily dispersible which comprises intimately mixing therewith a protein in an amount which is from about 1% to about 12% by weight of dry satin white, followed by adding thereto and mixing therewith a molecularly dehydrated alkali metal phosphate having a ratio of alkali metal to phosphorus pentoxide of from about 0.5:1 to about 2.0:1, said phosphate being in an amount which is from about 0.1% to about 3.0% of the weight of dry satin white.

2. The method as described in claim 1 where the molecularly dehydrated alkali metal phosphate is a sodium phosphate glass having a ratio of $No_2O:P_2O_5$ of from about 0.9:1 to about 1.7:1.

3. The method as described in claim 1 where the protein is casein glue and the molecularly dehydrated alkali metal phosphate is a sodium phosphate glass having a ratio of $Na_2O:P_2O_5$ of about 1 to 1.

4. The method as described in claim 1 where the protein is casein glue present in an amount ranging from about 10 percent by weight to about 12 percent by weight of dry satin white and the molecularly dehydrated alkali metal phosphate is a sodium phosphate glass having a ratio of $Na_2O:P_2O_5$ of about 1.1:1, said phosphate glass being present in a concentration of from about 0.3 percent by weight to about 1.0 percent by weight based on the dry weight of satin white.

RALPH N. THOMPSON.

References Cited in the file of this patent

UNITED STATES PATENTS

| Number | Name | Date |
|---|---|---|
| 2,345,311 | Wilson | Mar. 28, 1944 |
| 2,435,600 | Rafton | Feb. 10, 1948 |
| 2,513,121 | Lutt et al. | June 27, 1950 |